US008043774B2

(12) United States Patent
Zhang et al.

(10) Patent No.: US 8,043,774 B2
(45) Date of Patent: Oct. 25, 2011

(54) UNDERCOAT LAYERS AND METHODS FOR MAKING THE SAME

(75) Inventors: Lanhui Zhang, Webster, NY (US); Richardson H. Kilis, Ithaca, NY (US); Ma Lin, Webster, NY (US); Mark S. Thomas, Williamson, NY (US); Kent J. Evans, Lima, NY (US); Adilson P. Ramos, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 240 days.

(21) Appl. No.: 12/277,163

(22) Filed: Nov. 24, 2008

(65) Prior Publication Data

US 2010/0129743 A1 May 27, 2010

(51) Int. Cl.
*G03G 5/10* (2006.01)
*B32B 5/16* (2006.01)

(52) U.S. Cl. .......................................... 430/65; 428/331

(58) Field of Classification Search .................. 428/331; 430/65

See application file for complete search history.

(56) References Cited

U.S. PATENT DOCUMENTS 4,265,990 A 5/1981 Stolka et al.
4,286,033 A 8/1981 Neyhart et al.
4,291,110 A 9/1981 Lee
4,333,387 A 6/1982 Seitz
4,464,450 A 8/1984 Teuscher
4,664,995 A 5/1987 Horgan et al.
4,921,769 A 5/1990 Yuh et al.
4,921,773 A 5/1990 Melnyk et al.
5,215,839 A 6/1993 Yu
5,660,961 A 8/1997 Yu
5,853,906 A 12/1998 Hsieh
5,958,638 A 9/1999 Katayama et al.
6,156,468 A * 12/2000 Wehelie et al. ................. 430/65
6,858,363 B2 * 2/2005 Belknap et al. ................. 430/65
7,419,752 B2 * 9/2008 Wu et al. ....................... 430/59.6
7,732,111 B2 * 6/2010 Wu et al. ....................... 430/58.8
2004/0197686 A1 * 10/2004 Belknap et al. .............. 430/58.8
2004/0202947 A1 * 10/2004 Wu et al. ....................... 430/59.4
2005/0233231 A1 * 10/2005 Qi et al. ...................... 430/58.65
2005/0233235 A1 * 10/2005 Qi et al. .......................... 430/66
2007/0059620 A1 * 3/2007 Tong et al. ....................... 430/60
2007/0092815 A1 * 4/2007 Wu et al. ....................... 430/59.6

* cited by examiner

*Primary Examiner* — Hoa Le
(74) *Attorney, Agent, or Firm* — Pillsbury Winthrop Shaw Pittman LLP

(57) ABSTRACT

The presently disclosed embodiments are directed to layers that are useful in imaging apparatus members and components, for use in electrostatographic, including digital, apparatuses. More particularly, the present embodiments provide a robust undercoat layer comprising TiSi in which the $TiO_2$ to $SiO_2$ ratio falls in a particular ratio range discovered to reduce both plywood print defects as well as abnormal operating parameters and print defects from micro-cracks in the undercoat layer, and methods for making the same.

17 Claims, 2 Drawing Sheets

UNDERCOAT LAYERS AND METHODS FOR MAKING THE SAME

BACKGROUND

The presently disclosed embodiments relate generally to layers that are useful in imaging apparatus members and components, for use in electrostatographic, including digital, apparatuses. More particularly, the embodiments pertain to robust undercoat layer comprising TiSi in which the $TiO_2$ to $SiO_2$ ratio falls in a particular ratio range discovered to reduce both plywood print defects as well as undesirable electrical performance and print defects from micro-cracks in the undercoat layer, and methods for making the same.

Electrophotographic imaging members, e.g., photoreceptors, photoconductors, imaging members, and the like, can include a photoconductive layer formed on an electrically conductive substrate. The photoconductive layer is an insulator in the substantial absence of light so that electric charges are retained on its surface. Upon exposure to light, charge is generated by the photoactive pigment, and under applied field charge moves through the photoreceptor and the charge is dissipated.

In electrophotography, also known as xerography, electrophotographic imaging or electrostatographic imaging, the surface of an electrophotographic plate, drum, belt or the like (imaging member or photoreceptor) containing a photoconductive insulating layer on a conductive layer is first uniformly electrostatically charged. The imaging member is then exposed to a pattern of activating electromagnetic radiation, such as light. Charge generated by the photoactive pigment move under the force of the applied field. The movement of the charge through the photoreceptor selectively dissipates the charge on the illuminated areas of the photoconductive insulating layer while leaving behind an electrostatic latent image. This electrostatic latent image may then be developed to form a visible image by depositing oppositely charged particles on the surface of the photoconductive insulating layer. The resulting visible image may then be transferred from the imaging member directly or indirectly (such as by a transfer or other member) to a print substrate, such as transparency or paper. The imaging process may be repeated many times with reusable imaging members.

An electrophotographic imaging member may be provided in a number of forms. For example, the imaging member may be a homogeneous layer of a single material such as vitreous selenium or it may be a composite layer containing a photoconductor and another material. In addition, the imaging member may be layered. These layers can be in any order, and sometimes can be combined in a single or mixed layer.

Multilayered photoreceptors or imaging members can have at least two layers, and may include a substrate, a conductive layer, an optional charge blocking layer (sometimes referred to as an "undercoat layer"), an optional adhesive layer, a photogenerating layer (sometimes referred to as a "charge generation layer," "charge generating layer," or "charge generator layer"), a charge transport layer, an optional overcoating layer and, in some belt embodiments, an anticurl backing layer. In the multilayer configuration, the active layers of the photoreceptor are the charge generation layer (CGL) and the charge transport layer (CTL). Enhancement of charge transport across these layers provides better photoreceptor performance. Overcoat layers are commonly included to increase mechanical wear and scratch resistance. In conventional photoreceptors, mechanical wear due to cleaning blade contact or scratches due to contact with paper or carrier beads causes photoreceptor devices to fail. As such, overcoat layers are employed to extend the life of the photoreceptor.

Current manufacturing processes of photoreceptor undercoat layers having TiSi formulation results in inconsistent product performance. For example, some photoreceptors can exhibit high $V_{low}$, high $V_{residual}$, reduced photosensitivity, and print defects. As used herein, $V_{low}$ refers to the surface voltages of photoreceptor after light exposure, $V_{residual}$ refers to the surface voltages of photoreceptor after erase light exposure, and "photosensitivity" refers to the surface voltage change rate to the exposure energy. It was observed that the abnormal electrical performance and defects are related to micro-cracks within the TiSi under coat layer. In addition, TiSi undercoat layers can also suffer from "plywood effect," a print quality defect.

Coherent illumination is used in electrophotographic printing for image formation on photoreceptors. Unfortunately, the use of coherent illumination sources in conjunction with multilayered photoreceptors results in the "plywood effect," also known as "interference fringe effect." This defect consists of a series of dark and light interference patterns that occur when the coherent light is reflected from the interfaces that pervade multilayered photoreceptors. In organic photoreceptors, primarily the reflection from the undercoat layer or charge blocking layer/substrate interface (e.g., substrate surface) or the reflected light from the undercoat layer (or charge blocking layer)/charge generating layer interface account for the interference fringe effect. The effect can be eliminated if the strong undercoat layer surface reflection or the strong substrate surface reflection is eliminated or suppressed.

Thus, there is a need for an improved imaging layer that does not suffer from the above-described problems.

Conventional photoreceptors are disclosed in the following patents, a number of which describe the presence of light scattering particles in the undercoat layers: Yu, U.S. Pat. No. 5,660,961; Yu, U.S. Pat. No. 5,215,839; and Katayama et al., U.S. Pat. No. 5,958,638. The term "photoreceptor" or "photoconductor" is generally used interchangeably with the terms "imaging member." The term "electrostatographic" includes "electrophotographic" and "xerographic." The terms "charge transport molecule" are generally used interchangeably with the terms "hole transport molecule."

SUMMARY

According to aspects illustrated herein, there is provided a robust undercoat layer, comprising TiSi, and a binder resin, wherein TiSi is present in an amount of from about 90 weight percent of TiO2 and binder resin to 10 weight percent of SiO2 to about 94 weight percent of TiO2 and binder resin to 6 weight percent of SiO2, and further wherein the robust undercoat layer has a thickness of from about 3 microns to about 5 microns.

In another embodiment, there is provided an imaging member, comprising a substrate, a robust undercoat layer disposed on the substrate, the robust undercoat layer comprising TiSi, and a binder resin, wherein TiSi is present in an amount of from about 90 weight percent of TiO2 and binder resin to 10 weight percent of SiO2 to about 94 weight percent of TiO2 and binder resin to 6 weight percent of SiO2, and further wherein the robust undercoat layer has a thickness of from about 3 microns to about 5 microns, a charge generation layer disposed on the undercoat layer, and a charge transport layer disposed on the charge generation layer.

Yet another embodiment, there is provided a method for making a robust undercoat layer, comprising determining a critical lower ratio of $TiO_2$ to $SiO_2$, determining a critical upper ratio of $TiO_2$ to $SiO_2$, wherein the critical lower ratio and the critical upper ratio define a ratio range for which a undercoat layer comprising a $TiO_2$ to $SiO_2$ ratio within the ratio range will be robust, and forming an undercoat layer having a $TiO_2$ to $SiO_2$ ratio within the ratio range.

BRIEF DESCRIPTION OF THE DRAWINGS

For a better understanding, reference may be had to the accompanying figure.

Unless otherwise noted, the same reference numeral in different Figures refers to the same or similar feature.

DETAILED DESCRIPTION

Figure 1:
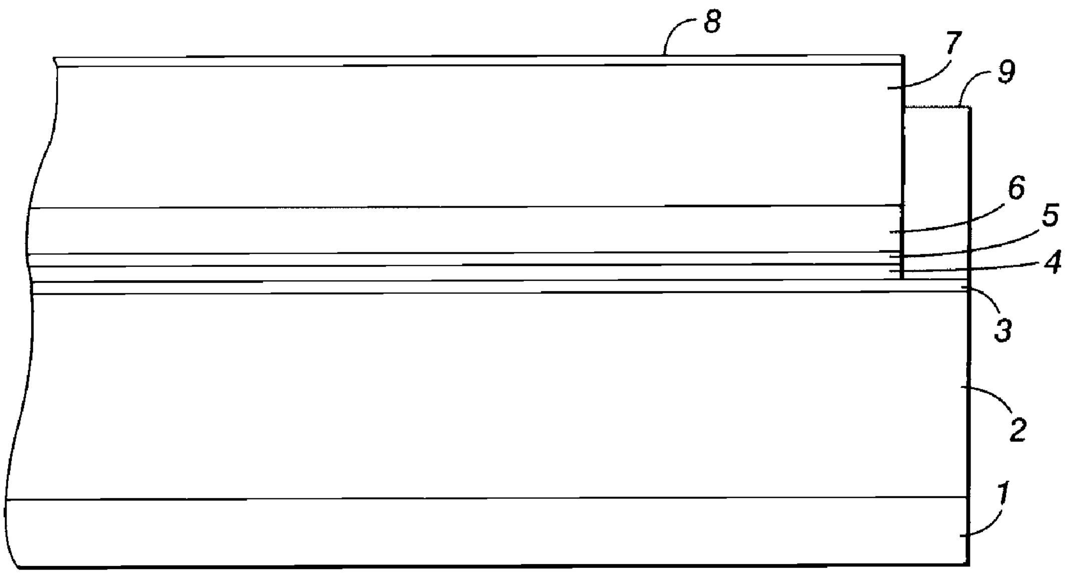
FIG. 1 represents a simplified side view of a photoreceptor in accordance with a first embodiment of the present embodiments.

In the following description, reference is made to the accompanying drawings, which form a part hereof and which illustrate several embodiments. It is understood that other embodiments may be utilized and structural and operational changes may be made without departure from the scope of the present disclosure. The same reference numerals are used to identify the same structure in different figures unless specified otherwise. The structures in the figures are not drawn according to their relative proportions and the drawings should not be interpreted as limiting the disclosure in size, relative size, or location.

The presently disclosed embodiments are directed generally to providing TiSi undercoat layers that incorporate a specific ratio of $TiO_2$ to $SiO_2$ that exhibits sufficient plywood suppression and provides good operating parameters, and methods for making the same.

"TiSi 90/10 undercoat layer" refers to a undercoat layer or charge blocking layer consisting of 90 weight percent of $TiO_2$ and binder resin, and 10 weight percent of $SiO_2$. It has been discovered that abnormal electrical properties such as high $V_{low}$, high $V_{residual}$, reduced photosensitivity, and print defects are related to micro-cracks within TiSi 90/10 under coat layers, which are in turn caused by current processing and coating conditions. The micro-cracks may be prevented by using a minimum $TiO_2/SiO_2$ ratio for a given coating thickness. In other words, there is a critical lower limit of $TiO_2/SiO_2$ that can be defined for a given UCL thickness. For example, the thicker the under coat layer is, the higher the critical $TiO_2/SiO_2$ ratio will be. However, care must be taken in how high a ratio of $TiO_2/SiO_2$ ratio is used. In order to provide sufficient plywood suppression, a critical upper limit of $TiO_2/SiO_2$ can be defined for a given UCL thickness. Thus, the present embodiments provide a robust UCL having $TiO_2/SiO_2$ ratio that prevents both micro-cracks and plywood effect, and methods to determine the proper working windows of the $TiO_2/SiO_2$ ratio for a given UCL thickness.

Figure 2:
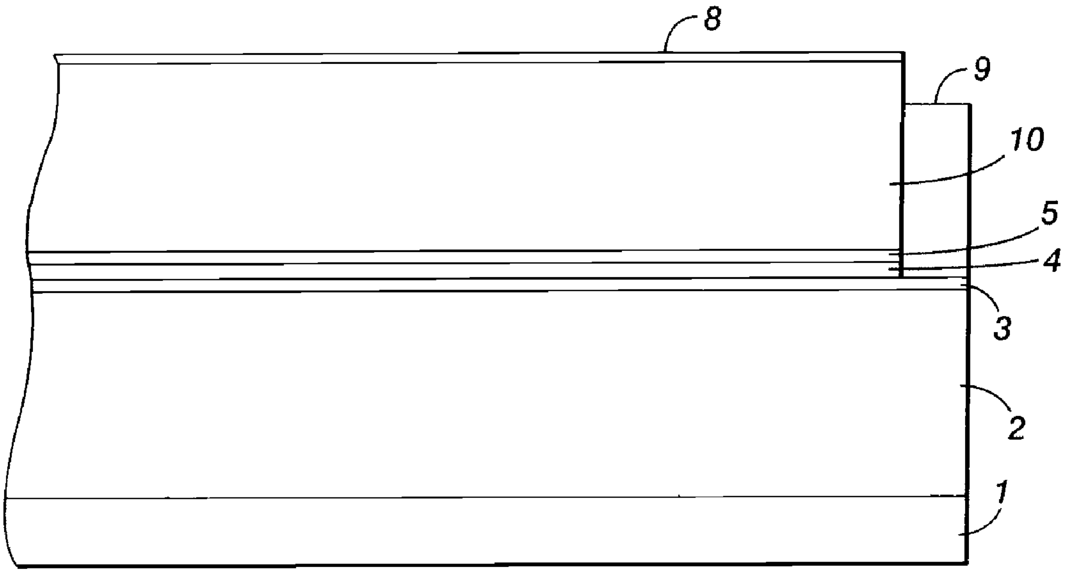
FIG. 2 represents a simplified side view of a photoreceptor in accordance with a second embodiment of the present embodiments.

Representative structures of an electrophotographic imaging member (e.g., a photoreceptor) are shown in FIGS. 1-2. These imaging members are provided with an anti-curl layer 1, a supporting substrate 2, an electrically conductive ground plane 3, an undercoat layer 4, an adhesive layer 5, a charge generating layer 6, a charge transport layer 7, an overcoating layer 8, and a ground strip 9. In FIG. 2, imaging layer 10 (containing both charge generating material and charge transport material) takes the place of separate charge generating layer 6 and charge transport layer 7.

As seen in the figures, in fabricating a photoreceptor, a charge generating material (CGM) and a charge transport material (CTM) may be deposited onto the substrate surface either in a laminate type configuration where the CGM and CTM are in different layers (e.g., FIG. 1) or in a single layer configuration where the CGM and CTM are in the same layer (e.g., FIG. 2) along with a binder resin. The photoreceptors embodying the present embodiments can be prepared by applying over the electrically conductive layer the charge generation layer 6 and, optionally, a charge transport layer 7. In embodiments, the charge generation layer and, when present, the charge transport layer, may be applied in either order.

The Anti-Curl Layer

For some applications, an optional anti-curl layer 1 can be provided, which comprises film-forming organic or inorganic polymers that are electrically insulating or slightly semiconductive. The anti-curl layer provides flatness and/or abrasion resistance. Anti-curl layer 1 can be formed at the back side of the substrate 2, opposite the imaging layers. The anti-curl layer may include, in addition to the film-forming resin, an adhesion promoter polyester additive. Examples of film-forming resins useful as the anti-curl layer include, but are not limited to, polyacrylate, polystyrene, poly(4,4'-isopropylidene diphenylcarbonate), poly(4,4'-cyclohexylidene diphenylcarbonate), mixtures thereof and the like.

Additives may be present in the anti-curl layer in any desired or effective amount, in one embodiment at least about 0.5 weight percent of the anti-curl layer, and in one embodiment no more than about 40 weight percent of the anti-curl layer, although the amount can be outside of these ranges. Suitable additives include organic and inorganic particles which can further improve the wear resistance and/or provide charge relaxation property. Suitable organic particles include Teflon powder, carbon black, and graphite particles. Suitable inorganic particles include insulating and semiconducting metal oxide particles such as silica, zinc oxide, tin oxide and the like. Another semiconducting additive is the oxidized oligomer salts as described in U.S. Pat. No. 5,853,906. The oligomer salts are oxidized N,N,N',N'-tetra-p-tolyl-4,4'-biphenyldiamine salt.

Adhesion promoters useful as additives include, but are not limited to, duPont 49,000 (duPont), Vitel PE-100, Vitel PE-200, Vitel PE-307 (Goodyear), mixtures thereof and the like. Any desired or effective amount of adhesion promoter can be selected for film-forming resin addition, in one embodiment at least about 1 weight percent adhesion promoter, and in one embodiment no more than about 15 weight percent adhesion promoter, based on the weight of the film-forming resin, although the amount can be outside of these ranges. The thickness of the anti-curl layer in one embodiment is at least about 3 microns, and in one embodiment no more than about 35 microns, and in more specific embodiments about 14 microns, although thicknesses outside these ranges can be used.

The anti-curl coating can be applied as a solution prepared by dissolving the film-forming resin and the adhesion promoter in a solvent such as methylene chloride. The solution may be applied to the rear surface of the supporting substrate (the side opposite the imaging layers) of the photoreceptor device, for example, by web coating or by other methods known in the art. Coating of the overcoat layer and the anti-curl layer can be accomplished simultaneously by web coating onto a multilayer photoreceptor comprising a charge transport layer, charge generation layer, adhesive layer, undercoat layer, ground plane and substrate. The wet film coating is then dried to produce the anti-curl layer 1.

The Supporting Substrate

As indicated above, the photoreceptors are prepared by first providing a substrate 2, e.g., a support. The substrate can be opaque or substantially transparent and can comprise any of numerous suitable materials having given required mechanical properties. The substrate can comprise a layer of electrically non-conductive material or a layer of electrically conductive material, such as an inorganic or organic composition. If a non-conductive material is employed, it is necessary to provide an electrically conductive ground plane over such non-conductive material. If a conductive material is used as the substrate, a separate ground plane layer may not be necessary.

The substrate can be flexible or rigid and can have any of a number of different configurations, such as, for example, a sheet, a scroll, an endless flexible belt, a web, a cylinder, and the like. The photoreceptor may be coated on a rigid, opaque, conducting substrate, such as an aluminum drum.

Various resins can be used as electrically non-conducting materials, including, but not limited to, polyesters, polycarbonates, polyamides, polyurethanes, and the like. Such a substrate can comprise a commercially available biaxially oriented polyester known as MYLAR™, available from E.I. duPont de Nemours & Co., MELINEX™, available from ICI Americas Inc., or HOSTAPHAN™, available from American Hoechst Corporation. Other materials of which the substrate may be comprised include polymeric materials, such as polyvinyl fluoride, available as TEDLAR™ from E.I. duPont de Nemours & Co., polyethylene and polypropylene, available as MARLEX™ from Phillips Petroleum Company, polyphenylene sulfide, RYTON™ available from Phillips Petroleum Company, and polyimides, available as KAPTON™ from E.I. duPont de Nemours & Co. The photoreceptor can also be coated on an insulating plastic drum, provided a conducting ground plane has previously been coated on its surface, as described above. Such substrates can either be seamed or seamless.

When a conductive substrate is employed, any suitable conductive material can be used. For example, the conductive material can include, but is not limited to, metal flakes, powders or fibers, such as aluminum, titanium, nickel, chromium, brass, gold, stainless steel, carbon black, graphite, or the like, in a binder resin including metal oxides, sulfides, silicides, quaternary ammonium salt compositions, conductive polymers such as polyacetylene or its pyrolysis and molecular doped products, charge transfer complexes, and polyphenyl silane and molecular (loped products from polyphenyl silane. A conducting plastic drum can be used, as well as a conducting metal drum made from a material such as aluminum.

The thickness of the substrate depends on numerous factors, including the required mechanical performance and economic considerations. The thickness of the substrate is in one embodiment at least about 65 microns, and in another embodiment at least about 75 microns, and in one embodiment no more than about 150 microns, and in another embodiment no more than about 125 microns for optimum flexibility and minimum induced surface bending stress when cycled around small diameter rollers, e.g., 19 mm diameter rollers, although the thickness can be outside of these ranges. The substrate for a flexible belt can be of substantial thickness, for example, over 200 microns, or of minimum thickness, for example, less than 50 microns, provided there are no adverse effects on the final photoconductive device. Where a drum is used, the thickness should be sufficient to provide the necessary rigidity. This is in specific embodiments at least about 1 mm and no more than about 6 mm, although the thickness can be outside of these ranges.

The surface of the substrate to which a layer is to be applied is often cleaned to promote greater adhesion of such a layer. Cleaning can be effected, for example, by exposing the surface of the substrate layer to plasma discharge, ion bombardment, and the like. Other methods, such as solvent cleaning, can be used.

Regardless of any technique employed to form a metal layer, a thin layer of metal oxide generally forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer.

The Electrically Conductive Ground Plane

As stated above, photoreceptors prepared in accordance with the present embodiments comprise a substrate that is either electrically conductive or electrically non-conductive. When a non-conductive substrate is employed, an electrically conductive ground plane 3 is employed, and the ground plane acts as the conductive layer. When a conductive substrate is employed, the substrate can act as the conductive layer, although a conductive ground plane may also be provided.

If an electrically conductive ground plane is used, it is positioned over the substrate. Suitable materials for the electrically conductive ground plane include, but are not limited to, aluminum, zirconium, niobium, tantalum, vanadium, hafnium, titanium, nickel, stainless steel, chromium, tungsten, molybdenum, copper, and the like, and mixtures and alloys thereof.

The ground plane can be applied by known coating techniques, such as solution coating, vapor deposition, and sputtering. One method of applying an electrically conductive ground plane is by vacuum deposition. Other suitable methods can also be used.

Thicknesses of the ground plane are within a substantially wide range, depending on the optical transparency and flexibility desired for the electrophotoconductive member. Accordingly, for a flexible photoresponsive imaging device, the thickness of the conductive layer is in one embodiment at least about 20 Angstroms, and in another embodiment at least about 50 Angstroms, and in one embodiment no more than about 750 angstroms, and in another embodiment no more than about 200 angstroms, although the thickness can be outside of these ranges, for an optimum combination of electrical conductivity, flexibility, and light transmission. However, the ground plane can, if desired, be opaque.

The Undercoat Layer

After deposition of any electrically conductive ground plane layer, an undercoat layer 4 can be applied thereto. Electron blocking layers for positively charged photoreceptors permit holes from the imaging surface of the photoreceptor to migrate toward the conductive layer. For negatively charged photoreceptors, any suitable hole blocking layer capable of forming a barrier to prevent hole injection from the conductive layer to the opposite photoconductive layer can be utilized. A blocking or undercoat layer is often positioned over the electrically conductive layer. The term "over," as used herein in connection with many different types of layers, should be understood as not being limited to instances wherein the layers are contiguous. Rather, the term refers to relative placement of the layers and encompasses the inclusion of unspecified intermediate layers.

The undercoat layer can generally include a binder. Suitable materials for the binder include polymers such as polyvinyl butyral, epoxy resins, polyesters, phenolic resins, polysiloxanes, polyamides, polyurethanes, and the like; nitrogen-containing siloxanes or nitrogen-containing titanium compounds, such as trimethoxysilyl propyl ethylene diamine, N-beta(aminoethyl) gamma-aminopropyl trimethoxy silane, isopropyl 4-aminobenzene sulfonyl titanate, di(dodecylbenezene sulfonyl) titanate, isopropyl di(4-aminobenzoyl)isostearoyl titanate, isopropyl tri(N-ethyl amino) titanate, isopropyl trianthranil titanate, isopropyl tri(N,N-dimethyl-ethyl amino) titanate, titanium-4-amino benzene sulfonate oxyacetate, titanium 4-aminobenzoate isostearate oxyacetate, gamma-aminobutyl methyl dimethoxy silane, gamma-aminopropyl methyl dimethoxy silane, and gamma-aminopropyl trimethoxy silane, as disclosed in U.S. Pat. Nos. 4,333,387, 4,286,033, and 4,291,110. The binder may be linear phenolic binder compositions including DURITE® P97 and DURITE® ESD-556C (both available from Borden Chemical) and a non-linear phenolic binder composition, VARCUM® 29108 (available from OxyChem). The binder may be present in an amount ranging from about 10% to about 80% by weight based on the weight of the dried undercoat layer.

The undercoat layer may optionally contain other ingredients including for example electron transporting materials such as diphenoquinones and n-type particles like titanium dioxide, and undercoat materials such as polyvinyl pyridine. These optional ingredients may be present in an amount ranging for example from 0 to about 80% by weight based on the weight of the undercoat layer.

The undercoat layer 4 should be continuous and has a thickness in one embodiment of at least about 0.01 micron, and in another embodiment of at least about 0.05 micron, and one embodiment of no more than about 20 microns, and in another embodiment no more than about 5 microns, although the thickness can be outside of these ranges The undercoat layer 4 can be applied by any suitable technique, such as spraying, dip coating, draw bar coating, gravure coating, silk screening, air knife coating, reverse roll coating, vacuum deposition, chemical treatment, and the like. For convenience in obtaining thin layers, the undercoat layer can be applied in the form of a dilute solution, with the solvent being removed after deposition of the coating by conventional techniques, such as by vacuum, heating, and the like. Generally, a weight ratio of undercoat layer material and solvent of between about 0.5:100 to about 60:40 is satisfactory for spray and dip coating.

In particular photoreceptors, a TiSi 90/10 undercoat layer is used. A TiSi 90/10 undercoat layer is one which comprises 90 weight percent of $TiO_2$ and binder resin, and 10 weight percent of $SiO_2$. The $TiO_2$ used may be STR60N (available from Sakai Chemical Industry Co. LTD. (Osaka, Japan)), and the binder resin used may be the solid component of VARCUM 29159 solution (available from TLC Ingredients, Inc. (Joliet, Ill.)) after drying. VARCUM 29159 solution is a phenolic resin solution in n-Butyl alcohol/Xylene. The $SiO_2$ used may be Silicon (Amorphous) Type 100 (available from Esprit Chemical Co. (Sarasota, Fla.)). Silicon (Amorphous) Type 100 contains amorphous silica particles that are surface treated to have an overcoating of polydimethylsiloxane.

The TiSi 90/10 undercoat layer was fabricated from a coating dispersion with the above-mentioned solid contents and a solvent of n-Butyl Alcohol/xylene mixture (1/1, w/w). The undercoat layer coating dispersion was prepared by three steps: 1) dispersing $TiO_2$ particles into a solution of VARCUM 29159 in xylene/n-butanol solvent mixture (1/1, w/w) using dynomill or other milling method such as attritor or bottle ball mill, where the weight ratio of $TiO_2$ to the binder resin solid is 60/40; 2) dispersing Silicon (Amorphous) Type 100 in a solution of VARCUM 29159 in xylene/n-butanol solvent mixture (1/1, w/w) by a mixer, where the weight ratio of $SiO_2$ to resin solid is 73.5/26.5; and 3) mixing $TiO_2$ dispersions and $SiO_2$ dispersions together to achieve the given Ti/Si ratio and required concentration. The resulting dispersion was then coated onto a drum substrate and dried at a given temperature for a given time to form an undercoat layer.

In practice, the TiSi 90/10 formulation often results in inconsistent product performance when targeting an undercoat layer at from about 3 microns to about 5 microns thick. As stated above, abnormal electrical performance and print defects can occur and were shown to be related to the micro-cracks within the TiSi under coat layer. TiSi undercoat layers of different thicknesses were prepared and coated from the same dispersion of 37.5% solid at different pull rates and then dried in the oven at 145° C. for 40 minutes. To better observe the micro-cracks, each of the undercoate layers were stained with a small amount of a pigment dispersion, Pc5/VMCH/NBA/xylene. “Pc5/VMCH/NBA” refers to a dispersion for charge-generating layer coating, where Pc5 is the pigment (chlorogallium phthalocyanine), VMCH is the binder (vinyl chloride vinyl acetate maleic acid terpolymer resin), and NBA is the solvent (n-butyl acetate). From observation, the micro-cracks appear as the coating gets thicker, indicating that there is a critical thickness for a given Ti/Si formulation and coating conditions, beyond which the micro-cracks will appear. The experiments demonstrated that such a critical thickness is $TiO_2/SiO_2$ ratio dependent. For example, a higher $TiO_2/SiO_2$ ratio results in a higher critical thickness. For a given undercoat layer thickness, there is also a critical $TiO_2/SiO_2$ ratio that can be defined. Thus, when the $TiO_2/SiO_2$ ratio becomes lower than the critical ratio, the TiSi undercoat layer will crack. For a TiSi UCL having a thickness of 4 microns, the minimum TiO2/SiO2 ratio was found to be 84.4/15.6, corresponding to the current TiSi 90/10 formulation.

A second set of experiments were conducted to determine the effect of the $TiO_2/SiO_2$ ratio on plywood suppression. A series of TiSi undercoat layer dispersions of varying $TiO_2/SiO_2$ ratios were coated into UCL-only devices with various thickness and checked for micro-cracks under microscope, as described previously. The same set of TiSi UCL dispersions were also coated into full photoreceptor devices with TiSi UCL (4 μm; heated 145° C. for 40 minutes), a Pc5/VMCH/NBA CGL (single dip coated at 130 mm/min) where Chlorogallium Phthalocyanine (Type B) is the pigment and the weight ratio of Pc5 to VMCH is about 52/48, and a CTL (140 mm/min, 24 μm; heated 135° C. for 40 minutes) being formed from a CTL solution comprising a binder (PCZ 400), charge transporting material (mTBD and N,N'-bis-(3,4-dimethylphenyl)-4-biphenylamine (Ae-18)), antioxidant (butylated hydroxytoluene (BHT)), and solvent (tetrahydrofuran (THF)/toluene, 70/30, w/w). For this specific photoreceptor device configuration, it was found that a $TiO_2/SiO_2$ ratio of up to 90.2/9.8, corresponding to a TiSi 94/6 formulation, can provide sufficient plywood suppression. Thus, the $TiO_2/SiO_2$ ratio upper limit is determined by the plywood suppression effectiveness. Shown in FIG. 3 are the electrical results tested under Hodaka protocol in B-zone conditions (22+/−2° C., 45+/−10% RH), “RH” being relative humidity.

In further embodiments, the robust undercoat layer having a thickness of from about 3.5 microns to about 4.5 microns may have a ratio of $TiO_2$ to $SiO_2$ of from about 84.4/15.6 to about 90.2/9.8. In other embodiments, the ratio is from about 85.9/14.1 to about 88.7/11.3.

Briefly, the photoreceptors were tested in a scanner set to obtain photoinduced discharge cycles, sequenced at one charge-erase cycle followed by one charge-expose-erase cycle, wherein the light intensity was incrementally increased with cycling to produce a series of photoinduced discharge characteristic curves from which the photosensitivity and surface potentials at various exposure intensities are measured. Additional electrical characteristics were obtained by a series of charge-erase cycles with incrementing surface potential to generate several voltage versus charge density curves. The scanner was equipped with a scorotron set to a constant voltage charging at various surface potentials. The photoconductors were tested at surface potentials of 500 volts with the exposure light intensity incrementally increased by means of regulating a series of neutral density filters. The exposure light source was a 780 nanometer light emitting diode. The Hodaka test protocol refers to a surface potential of 500 V, and photoreceptor rotation speed of 36.6 rpm.

Figure 3:
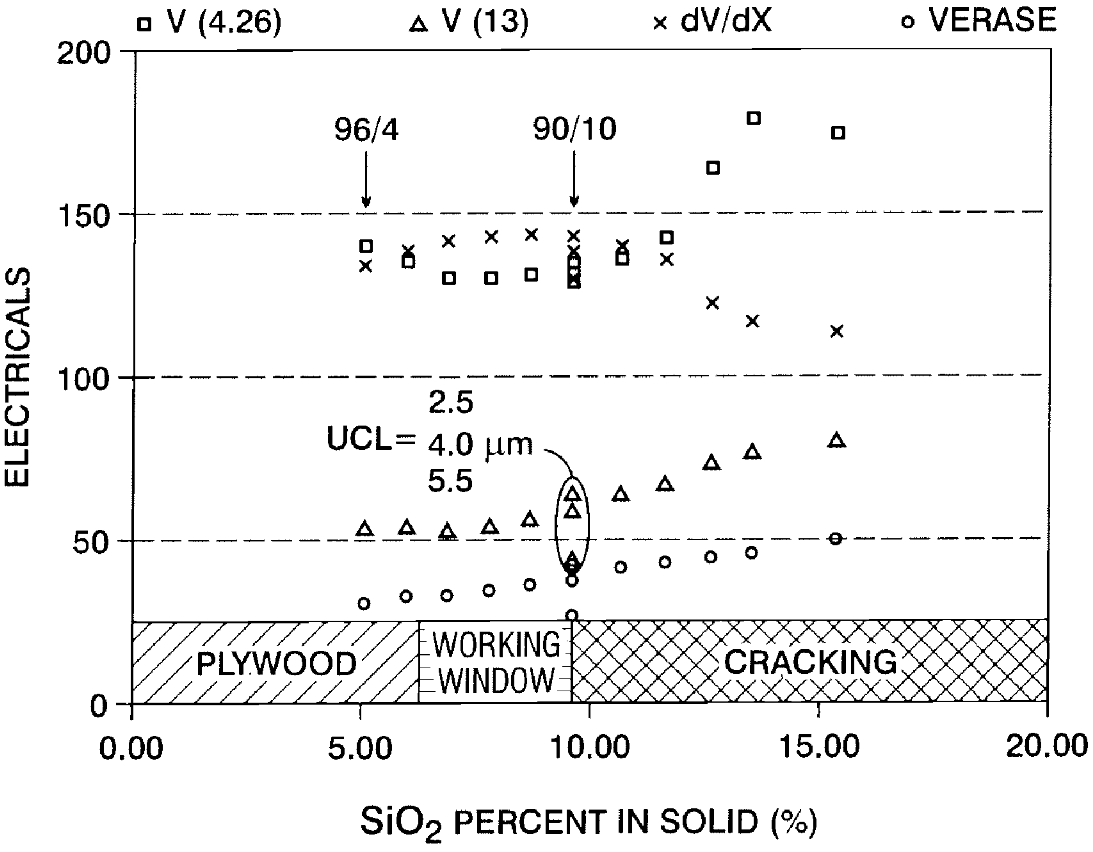
FIG. 3 is a graph illustrating electrical performance data defining a working window for TiSi UCL ratio formulation in accordance with the present embodiments.

As shown in FIG. 3, the critical $TiO_2/SiO_2$ ratio matches the turning points of high $V_{low}$, high $V_{residual}$, reduced photosensitivity and therefore the print defects as well. $V_{low}$ refers to the surface voltages of photoreceptor after light exposure, such as $V_{(4.26)}$ and $V_{(13)}$ in FIG. 3, where 4.26 and 13 are the exposure light energy in ergs/cm$^2$. $V_{residual}$ refers to $V_{erase}$ in FIG. 3, the surface voltages of photoreceptor after erase light exposure. "Photosensitivity" refers to −dv/dx in FIG. 3, the surface voltage change rate to the exposure energy.

Thus, the present embodiments provide a robust undercoat layer, and imaging members using the same, comprising TiSi in which the $TiO_2$ to $SiO_2$ ratio falls in a particular ratio range where a critical lower ratio limit is about 84.4/15.6, and a critical upper ratio limit is about 90.2/9.8. Fabricating TiSi undercoat layers with these compositions were shown to exhibit both plywood suppression and avoid abnormal electrical performance and print defects from micro-cracks in the undercoat layer.

In further embodiments, there are provided methods for determining the critical lower and upper ratio limits. The lower ratio limit can be determined by either: (a) coating UCL-only devices at different ratio amounts and subsequently visually checking for micro-cracks by microscope or (b) coating full photoreceptor devices and subsequently checking for abnormal electrical performance and/or print defects by electrical property measurement. The upper limit can be determined by coating full photoreceptor devices and subsequently checking for abnormal electrical performance and/or print defects by print tests.

The Adhesive Layer

An intermediate layer 5 between the undercoat layer and the charge generating layer may, if desired, be provided to promote adhesion. However, in the present embodiments, a dip coated aluminum drum may be utilized without an adhesive layer.

Additionally, adhesive layers can be provided, if necessary between any of the layers in the photoreceptors to ensure adhesion of any adjacent layers. Alternatively, or in addition, adhesive material can be incorporated into one or both of the respective layers to be adhered. Such optional adhesive layers can have thicknesses of at least 0.001 micron in one embodiment, and in another embodiment, no more than about 0.2 micron, although the thicknesses can also be outside of these ranges. Such an adhesive layer can be applied, for example, by dissolving adhesive material in an appropriate solvent, applying by hand, spraying, dip coating, draw bar coating, gravure coating, silk screening, air knife coating, vacuum deposition, chemical treatment, roll coating, wire wound rod coating, and the like, and drying to remove the solvent. Suitable adhesives include, for example, film-forming polymers, such as polyester, dupont 49,000 (available from E.I. duPont de Nemours & Co.), Vitel PE-100 (available from Goodyear Tire and Rubber Co.), polyvinyl butyral, polyvinyl pyrrolidone, polyurethane, polymethyl methacrylate, and the like. The adhesive layer may comprise a polyester with a M of at least 50,000 in one embodiment, or no more than about 100,000 in another embodiment, although the amount can be outside of these ranges. In further embodiments, the polyester has a $M_w$ of about 70,000, and a $M_n$ of about 35,000.

The Imaging Layer(s)

The imaging layer refers to a layer or layers containing charge generating material, charge transport material, or both the charge generating material and the charge transport material. Either a n-type or a p-type charge generating material can be employed in the present photoreceptor.

The phrase "n-type" refers to materials which predominately transport electrons. Examples of n-type materials include dibromoanthanthrone, benzimidazole perylene, zinc oxide, titanium dioxide, azo compounds such as chlorodiane Blue and bisazo pigments, substituted 2,4-dibromotriazines, polynuclear aromatic quinones, zinc sulfide, and the like.

The phrase "p-type" refers to materials which transport holes. Examples of p-type organic pigments include, for example, metal-free phthalocyanine, titanyl phthalocyanine, gallium phthalocyanine, hydroxy gallium phthalocyanine, chlorogallium phthalocyanine, copper phthalocyanine, and the like.

Illustrative organic photoconductive charge generating materials include azo pigments such as Sudan Red, Dian Blue, Janus Green B, and the like; quinone pigments such as Algol Yellow, Pyrene Quinone, Indanthrene Brilliant Violet RRP, and the like; quinocyanine pigments; perylene pigments such as benzimidazole perylene; indigo pigments such as indigo, thioindigo, and the like; bisbenzoimidazole pigments such as Indofast Orange, and the like; phthalocyanine pigments such as copper phthalocyanine, aluminochloro-phthalocyanine, hydroxygallium phthalocyanine, and the like; quinacridone pigments; or azulene compounds. Suitable inorganic photoconductive charge generating materials include for example cadium sulfide, cadmium sulfoselenide, cadmium selenide, crystalline and amorphous selenium, lead oxide and other chalcogenides. Alloys of selenium are encompassed by embodiments of the instant embodiments and include for instance selenium-arsenic, selenium-tellurium-arsenic, and selenium-tellurium.

Any suitable inactive resin binder material may be employed in the charge generating layer. Examples of organic resinous binders include polycarbonates, acrylate polymers, methacrylate polymers, vinyl polymers, cellulose polymers, polyesters, polysiloxanes, polyamides, polyurethanes, epoxies, polyvinylacetals, and the like.

To create a dispersion useful as a coating composition, a solvent is used with the charge generating material. The solvent can be for example cyclohexanone, methyl ethyl ketone, tetrahydrofuran, alkyl acetate, and mixtures thereof. The alkyl acetate (such as butyl acetate and amyl acetate) can have from 3 to 5 carbon atoms in the alkyl group. The amount of solvent in the composition ranges for example at least 70% by weight, based on the weight of the composition. In one embodiment, the amount is no more than about 98% by weight, based on the weight of the composition, although the amount can be outside of these ranges.

The amount of the charge generating material in the composition ranges for example at least 0.5% by weight, based on the weight of the composition including a solvent. In another embodiment, the amount is no more than 30% by weight, based on the weight of the composition including a solvent, although the amount can be outside of these ranges. The amount of photoconductive particles (i.e, the charge generating material) dispersed in a dried photoconductive coating varies to some extent with the specific photoconductive pigment particles selected. For example, when phthalocyanine organic pigments such as titanyl phthalocyanine and metal-free phthalocyanine are utilized, satisfactory results are achieved when the dried photoconductive coating comprises between about 30 percent by weight and about 90 percent by weight of all phthalocyanine pigments based on the total weight of the dried photoconductive coating. Since the photoconductive characteristics are affected by the relative amount of pigment per square centimeter coated, a lower pigment loading may be utilized if the dried photoconductive coating layer is thicker. Conversely, higher pigment loadings are desirable where the dried photoconductive layer is to be thinner.

Generally, satisfactory results are achieved with an average photoconductive particle size of less than about 0.6 micron when the photoconductive coating is applied by dip coating. In a more specific embodiment, the average photoconductive particle size is less than about 0.4 micron. In one embodiment, the photoconductive particle size is also less than the thickness of the dried photoconductive coating in which it is dispersed, although the thicknesses can also be outside of these ranges.

In a charge generating layer, the weight ratio of the charge generating material ("CGM") to the binder ranges from 30 (CGM): 70 (binder) to 70 (CGM): 30 (binder), although the amount can be outside of these ranges.

For multilayered photoreceptors comprising a charge generating layer (also referred herein as a photoconductive layer) and a charge transport layer, satisfactory results may be achieved with a dried photoconductive layer coating thickness of between about 0.1 micron and about 10 microns. In one embodiment, the photoconductive layer thickness is at least 0.2 micron, and in another embodiment, no more than 4 microns, although the thicknesses can also be outside of these ranges. However, these thicknesses also depend upon the pigment loading. Thus, higher pigment loadings permit the use of thinner photoconductive coatings. Thicknesses outside these ranges can be selected providing the objectives of the present embodiments are achieved.

Any suitable technique may be utilized to disperse the photoconductive particles in the binder and solvent of the coating composition. Examples of dispersion techniques include, for example, ball milling, roll milling, milling in vertical attritors, sand milling, and the like.

Charge transport materials include an organic polymer or non-polymeric material capable of supporting the injection of photoexcited holes or transporting electrons from the photoconductive material and allowing the transport of these holes or electrons through the organic layer to selectively dissipate a surface charge. Illustrative charge transport materials include for example a positive hole transporting material selected from compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and hydrazone compounds. Examples of hole transport materials include electron donor materials, such as carbazole; N-ethyl carbazole; N-isopropyl carbazole; N-phenyl carbazole; tetraphenylpyrene; 1-methylpyrene; perylene; chrysene; anthracene; tetraphene; 2-phenyl naphthalene; azopyrene; 1-ethyl pyrene; acetyl pyrene; 2,-benzochrysene; 2,4-benzopyrene; 1,4-bromopyrene; poly(N-vinylcarbazole); poly(vinylpyrene); poly(vinyltetraphene); poly (vinyltetracene) and poly(vinylperylene). Suitable electron transport materials include electron acceptors such as 2,4,7-trinitro-9-fluorenone; 2,4,5,7-tetranitro-fluorenon; dinitroanthracene; dinitroacridene; tetracyanopyrene; dinitroanthraquinone; and butylcarbonylfluorenemalononitrile, reference U.S. Pat. No. 4,921,769. Other hole transporting materials include arylamines described in U.S. Pat. No. 4,265,990, such as N,N'-diphenyl-N,N'-bis(alkylphenyl)-(1,1'-biphenyl)-4,4'-dia mine wherein alkyl is selected from the group consisting of methyl, ethyl, propyl, butyl, hexyl, and the like. Other known charge transport layer molecules can be selected, reference for example U.S. Pat. Nos. 4,921,773 and 4,464,450.

Any suitable electrically inactive resin binder may be employed in the charge transport layer such as polycarbonate resin, polyvinylcarbazole, polyester, polyarylate, polystyrene, polyacrylate, polyether, polysulfone, and the like. In embodiments, electrically active polymeric resins can also be used, such as polysiloxane, poly(tetrahydrofuran), PVK, and the like. In some embodiments resin materials for use in forming the charge transport layer include polycarbonate resins having a weight average molecular weight of from about 20,000 to about 150,000, or from about 50,000 about 120,000. Electrically inactive resin materials which may be utilized in the charge transport layer include poly(4,4'-dipropylidene-diphenylene carbonate) with a weight average molecular weight of from about 35,000 to about 40,000 (available as LEXAN® 145 from General Electric Company), poly(4,4'-propylidene-diphenylene carbonate) with a weight average molecular weight of from about 40,000 to about 45,000 (available as LEXAN® 141 from the General Electric Company), a polycarbonate resin having a weight average molecular weight of from about 50,000 to about 100,000 (available as MAKROLON® from Farbenfabricken Bayer A.G.), a polycarbonate resin having a weight average molecular weight of from about 20,000 to about 50,000 (available as MERLON® from Mobay Chemical Company), and a polycarbonate resin having a weight average molecular weight of from about 20,000 to about 80,000 (available as PCZ from Mitsubishi Chemicals). Solvents such as methylene chloride, tetrahydrofuran, toluene, monochlorobenzene, or mixtures thereof, may be utilized in forming the charge transport layer coating mixture. In a charge transport layer, the weight ratio of the charge transport material (CTM) to the binder may range from 30 (CTM): 70 (binder) to 70 (CTM): 30 (binder).

Optionally, any suitable particulate organic or inorganic fillers, which are uniformly dispersed in the entire CTL, can be employed in the charge transport layer for wear reduction, wear uniformity improvement, friction adjustment, plywood suppression or other purpose, such as polytetrafluoroethylene (PTFE), silica (SiO2), etc. These filler particles may or may not have surface modification for better processing or performance, either by physical coating or chemical reaction.

Any suitable technique may be utilized to apply the charge transport layer and the charge generating layer to the substrate. Examples of coating techniques, include dip coating, roll coating, spray coating, rotary atomizers, and the like. The coating techniques may use a wide concentration of solids. In one embodiment, the solids content is at least 2 percent by weight based on the total weight of the dispersion. In another embodiment, the solids content is no more than 30 percent by weight based on the total weight of the dispersion, although the amount can be outside of these ranges. The expression "solids" refers to the photoconductive pigment particles and binder components of the charge generating coating dispersion and to the charge transport particles and binder components of the charge transport coating dispersion. These solids concentrations are useful in dip coating, roll, spray coating, and the like. Generally, a more concentrated coating dispersion is used for roll coating. Drying of the deposited coating may be effected by any suitable conventional technique such as oven drying, infra-red radiation drying, air drying and the like. Generally, the thickness of the charge generating layer ranges. For example, in one embodiment, the thickness is at least 0.1 micron, and in another embodiment, no more than 3 microns, although the amount can be outside of these ranges. The thickness of the transport layer may be at least 5 microns in one embodiment, and no more than 100 microns in another embodiment, but thicknesses outside these ranges can also be used. In general, the ratio of the thickness of the charge transport layer to the charge generating layer is maintained from about 2:1 to 200:1 and in some instances as great as 400:1, although the amount can be outside of these ranges.

The materials and procedures described herein can be used to fabricate a single imaging layer type photoreceptor containing a binder, a charge generating material, and a charge transport material. For example, the solids content in the dispersion for the single imaging layer may range. For example, the solids content is at least 2% by weight, based on the weight of the dispersion, in one embodiment. In another embodiment, the solids content is no more than 30% by weight, based on the weight of the dispersion, although the amount can be outside of these ranges.

Where the imaging layer is a single layer combining the functions of the charge generating layer and the charge transport layer, illustrative amounts of the components contained therein are as follows: charge generating material (about 5% to about 40% by weight), charge transport material (about 20% to about 60% by weight), and binder (the balance of the imaging layer).

The Overcoating Layer

Present embodiments can, optionally, further include an overcoating layer or layers 8, which, if employed, are positioned over the charge generation layer or over the charge transport layer. This layer comprises organic polymers or inorganic polymers that are electrically insulating or slightly semi-conductive.

Such a protective overcoating layer includes a film forming resin binder optionally doped with a charge transport material. Any suitable film-forming inactive resin binder can be employed in the overcoating layer of the present embodiments. For example, the film forming binder can be any of a number of resins, such as polycarbonates, polyarylates, polystyrene, polysulfone, polyphenylene sulfide, polyetherimide, polyphenylene vinylene, and polyacrylate. The resin binder used in the overcoating layer can be the same or different from the resin binder used in the anti-curl layer or in any charge transport layer that may be present. The binder resin in specific embodiments has a Young's modulus greater than about $2\times10^5$ psi, a break elongation no less than 10%, and a glass transition temperature greater than about 150 degrees C. The binder may further be a blend of binders. Some specific polymeric film forming binders include MAKROLON™, a polycarbonate resin having a weight average molecular weight of about 50,000 to about 100,000 available from Farbenfabriken Bayer A. G., 4,4'-cyclohexylidene diphenyl polycarbonate, available from Mitsubishi Chemicals, high molecular weight LEXAN™ 135, available from the General Electric Company, ARDEL™ polyarylate D-100, available from Union Carbide, and polymer blends of MAKROLON™ and the copolyester VITEL™ PE-100 or VITEL™ PE-200, available from Goodyear Tire and Rubber Co.

In embodiments, at least 1% by weight of the overcoating layer of VITEL™ copolymer is used in blending compositions. In one embodiment, no more than about 10% by weight of the overcoating layer of VITEL™ copolymer is used in blending compositions. In specific embodiments, at least 3% by weight is used in one embodiment and no more than 7% by weight is used in another embodiment, although the amount can be outside of these ranges. Other polymers that can be used as resins in the overcoat layer include DUREL™ polyarylate from Celanese, polycarbonate copolymers LEXAN™ 3250, LEXAN™ PPC 4501, and LEXAN™ PPC 4701 from the General Electric Company, and CALIBRE™ from Dow.

Additives may be present in the overcoating layer. In one embodiment the additive is present by at least 0.5 weight percent of the overcoating layer. In another, the additive is present by no more than 40 weight percent of the overcoating layer, although the amount can be outside of these ranges. Examples of additives include organic and inorganic particles which can further improve the wear resistance and/or provide charge relaxation property. Examples of organic particles include Teflon powder, carbon black, and graphite particles. Examples of inorganic particles include insulating and semiconducting metal oxide particles such as silica, zinc oxide, tin oxide and the like. Another semiconducting additive is the oxidized oligomer salts as described in U.S. Pat. No. 5,853,906. The oligomer salts are oxidized N,N,N',N'-tetra-p-tolyl-4,4'-biphenyldiamine salt.

The overcoating layer can be prepared by any suitable conventional technique and applied by any of a number of application methods. Examples of application methods include, for example, hand coating, spray coating, web coating, dip coating and the like. Drying of the deposited coating can be effected by any suitable conventional techniques, such as oven drying, infrared radiation drying, air drying, and the like.

Overcoatings of from about 3 microns to about 7 microns are effective in preventing charge transport molecule leaching, crystallization, and charge transport layer cracking. In one specific embodiment, a layer having a thickness of from about 3 microns to about 5 microns is employed, although the amount can be outside of these ranges.

The Ground Strip

Ground strip 9 can comprise a film-forming binder and electrically conductive particles. Cellulose may be used to disperse the conductive particles. Any suitable electrically conductive particles can be used in the electrically conductive ground strip layer 9. The ground strip 9 can, for example, comprise materials that include those enumerated in U.S. Pat. No. 4,664,995. Examples of electrically conductive particles include, but are not limited to, carbon black, graphite, copper, silver, gold, nickel, tantalum, chromium, zirconium, vanadium, niobium, indium tin oxide, and the like.

The electrically conductive particles can have any suitable shape. Examples of shapes include irregular, granular, spherical, elliptical, cubic, flake, filament, and the like. In one embodiment, the electrically conductive particles have a particle size less than the thickness of the electrically conductive ground strip layer to avoid an electrically conductive ground strip layer having an excessively irregular outer surface. An average particle size of less than about 10 microns generally avoids excessive protrusion of the electrically conductive particles at the outer surface of the dried ground strip layer and ensures relatively uniform dispersion of the particles through the matrix of the dried ground strip layer. Concentration of the conductive particles to be used in the ground strip depends on factors such as the conductivity of the specific conductive materials utilized.

In embodiments, the ground strip layer may have a thickness of from about 7 microns to about 42 microns and, in one specific embodiment, from about 14 microns to about 27 microns, although the amount can be outside of these ranges.

Various exemplary embodiments encompassed herein include a method of imaging which includes generating an electrostatic latent image on an imaging member, developing a latent image, and transferring the developed electrostatic image to a suitable substrate.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The example set forth herein below and is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

Example 1

A series of TiSi UCL dispersions were prepared by blending given amount pre-milled $TiO_2$-only dispersion, pre-dispersed $SiO_2$/VARCUM dispersion, and a solvent xylene/n-butanol (1/1, w/w), where the total solid percentages were kept the same 37.5 wt %. The pre-milled $TiO_2$-only dispersion was prepared by dispersing $TiO_2$ particles (STR60N, available from Sakai Chemical Industry Co. LTD. (Osaka, Japan)) into a solution of VARCUM 29159 (available from TLC Ingredients, Inc. (Joliet, Ill.)) in xylene/n-butanol solvent mixture (1/1, w/w) using dynomill method, where the weight ratio of $TiO_2$ to the binder resin solid is 60/40. The milling end point surface area was 29 $m^2$/g as measured by HORIBA CAPA 700 (available from Horiba (Edison, N.J.)). The pre-dispersed $SiO_2$/VARCUM dispersion was prepared by dispersing Silicon (Amorphous) Type 100 in a solution of VARCUM 29159 in xylene/n-butanol solvent mixture (1/1, w/w) with a mixer. The UCL dispersions were then coated in six speed stages using the Tsukiage coater and heated in an oven at 145° C. for 40 minutes. Each coated drum was measured for thickness and then stained by Pc5 CGL dispersion for cracking defect checking. Visual observations for cracking indicated that the threshold thickness where cracking begins to appear gradually increases as the Ti/Si ratio also increases. Using the measured thicknesses, a coating speed is calculated for each dispersion in order to achieve the 4 μm UCL thickness needed in a full photoreceptor device. Next, full photoreceptor devices were coated with TiSi UCL (4 μm; heated 145° C. for 40 minutes), a Pc5/VMCH/NBA CGL (single dip coated at 130 mm/min) where Chlorogallium Phthalocyanine (Type B) is the pigment and the weight ratio of Pc5 to VMCH is about 52/48, and a CTL (140 mm/min, 24 μm; heated 135° C. for 40 minutes) being formed from a CTL solution comprising a binder (PCZ 400), charge transporting material (mTBD and N,N'-bis-(3,4-dimethylphenyl)-4-biphenylamine (Ae-18)), antioxidant (butylated hydroxytoluene (BHT)), and solvent (tetrahydrofuran (THF)/toluene, 70/30, w/w).

As stated above, FIG. 3, shows the electrical data (Hodaka test protocol, B-zone) indicating that the turning points of Vlow, Vresidual and photosensitivity match the critical TiO2/SiO2 ratio determined by UCL-only device observations very well. Furthermore, the current TiSi 90/10 formulation was found to be right near the critical area where cracking defects begin to occur and is shown that it is the variation of $TiO_2$/$SiO_2$ ratio that caused the occasional and irregular appearance of cracks.

Example 2

Further experiments were conducted on the prepared TiSi 90/10 UCL to determine their actual $TiO_2$/$SiO_2$ values as measured by an Inductively Coupled Plasma (ICP) Atomic Emission Spectrometer, as well as the coating quality of the 4 microns UCL film. It can be seen from Table 1 that whenever the $TiO_2$/$SiO_2$ falls outside the range (lower than 84.4/15.6), the 4 microns UCL will crack.

TABLE 1

$TiO_2$/$SiO_2$ Ratio and UCL Coating Quality

| Batch No. | $TiO_2$/$SiO_2$ (w/w) | Coating quality |
|---|---|---|
| 92 | 85.5/14.5 | Good |
| 90/10 formulation | 84.4/15.6 | — |
| 95 | 84.3/15.7 | Cracking |
| 93 | 84.0/16.0 | Cracking |

Example 3

A planed experiment was conducted to demonstrate that the cracking problem can be solved by adjusting the $TiO_2$/$SiO_2$ ratio into the working window. The nature of the VARCUM resin solution prevents the measurement of a true solid content by the current procedure, but experiments have proven consistency where 0.4 g of the solution was heated in a metal weighing pan at 150° C. for 40 minutes. Results of this experiment show that the current solid content of $TiO_2$ dispersion was overestimated (46.4% vs. 44%), causing the error in the calculation of blending formulation of the final dispersion.

Listed in Table 2 are (1) the target composition; (2) current problematic dispersion, in which TiO2/SiO2 ratio has deviated from the target due to an over-estimated solid % value of $TiO_2$-only millbase being used for the calculation of $SiO_2$ addition; (3) the TiO2-only millbase batch #100; (4) proposed testing blending formula to correct the TiO2/SiO2 to the target value of "90/10" formulation; (5) proposed testing blending formula to adjust the TiO2/SiO2 to match the "91/9" formulation to provide wider latitude for coating condition optimization. It is expected that both blending (4) and (5) should provide cracking-free 4-micron UCL and solve the high $V_{low}$, high $V_{residual}$, reduced photosensitivity, and print defect problems.

TABLE 2

| | $SiO_2$ % of solid | Resin % of solid | $TiO_2$ % of solid |
|---|---|---|---|
| Estimation of Ti/Si ratio using "over-estimated" $TiO_2$-only solid %: | | | |
| (1) TiSi 90/10 formula | 9.64% | 38.23% | 52.13% |
| (2) Current TiSi 90/10 dispersion, due to a higher solid % value of $TiO_2$-only millbase was used for the calculation of $SiO_2$ addition (solid % = 37.5% by new procedure) | 10.09% | 38.15% | 51.76% |
| (3) $TiO_2$-only millbase, batch #100 (solid % = 44% by new procedure, or 46.4% by old procedure) | | 40% | 60% |
| correction of dispersion with "Over-estimated" $TiO_2$ solid %: | | | |
| (4) blend (2)/(3)/solvent at 100:4:0.6 by wt. ==> true 90/10 formula; amount of solvent (xylene/n-BuOH = 1/1) can be adjusted to meet solid % requirement if necessary. | 9.64% | 38.23% | 52.13% |
| (5) blend (2)/(3)/solvent at 100:13.6:2.4 by wt. ==> true 91/9 formula; amount of solvent (xylene/n-BuOH = 1/1) can be adjusted to meet solid % requirement if necessary. | 8.70% | 38.40% | 52.90% |

All the patents and applications referred to herein are hereby specifically, and totally incorporated herein by reference in their entirety in the instant specification.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A robust undercoat layer, comprising:

$TiO_2$;

$SiO_2$; and a binder resin;

wherein the ratio of the sum of $TiO_2$ and the binder resin to $SiO_2$ is from 91/9 to 93/7; the ratio of $SiO_2$ to the sum of $SiO_2$, $TiO_2$ and binder resin is from 6.9 to 8.7, and further wherein the robust undercoat layer has a thickness of from about 3 microns to about 5 microns.

2. The robust undercoat layer of claim 1, wherein the robust undercoat layer has a thickness of from about 3.5 microns to about 4.5 microns.

3. The robust undercoat layer of claim 1, wherein the $SiO_2$ is surface treated to have an overcoating of polydimethylsiloxane.

4. The robust undercoat layer of claim 1, wherein the binder resin is selected from the group consisting of phenolic resins, and mixtures thereof.

5. The robust undercoat layer of claim 1, wherein the binder resin formed from a phenolic resin solution in n-Butyl alcohol/Xylene.

6. An imaging member, comprising:

a substrate;

a robust undercoat layer disposed on the substrate, the robust undercoat layer comprising:

$TiO_2$;

$SiO_2$; and a binder resin;

wherein the ratio of the sum of $TiO_2$ and the binder resin to $SiO_2$ is from 91/9 to 93/7; the ratio of $SiO_2$ to the sum of $SiO_2$, $TiO_2$ and binder resin is from 6.9 to 8.7, and further wherein the robust undercoat layer has a thickness of from about 3 microns to about 5 microns;

a charge generation layer disposed on the undercoat layer; and a charge transport layer disposed on the charge generation layer.

7. The imaging member of claim 6, wherein the robust undercoat layer has a thickness of from about 3.5 microns to about 4.5 microns.

8. The imaging layer of claim 6, wherein the $SiO_2$ is surface treated to have an overcoating of polydimethylsiloxane.

9. The imaging layer of claim 6, wherein the binder resin is selected from the group consisting of phenolic resins, and mixtures thereof.

10. The imaging layer of claim 6, wherein the binder resin formed from a phenolic resin solution in n-Butyl alcohol/Xylene.

11. The robust undercoat layer of claim 1, wherein the binder resin is present in an amount from about 10 percent by weight to about 80 percent by weight based on the weight of the dried undercoat layer.

12. The robust undercoat layer of claim 1, wherein the ratio of $TiO_2$ to binder resin is from 1.36 to 1.5.

13. The imaging member of claim 6, wherein the charge transport layer comprises N,N'-bis-(3,4-dimethylphenyl)-4-biphenylamine.

14. The imaging member of claim 6, wherein the charge transport layer comprises an antioxidant.

15. The imaging member of claim 14, wherein the antioxidant is butylated hydroxytoluene.

16. The robust undercoat layer of claim 1, wherein the ratio of the sum of $TiO_2$ and the binder resin to $SiO_2$ is from 92/8 to 93/7; the ratio of SiO2 to the sum of SiO2, TiO2 and binder resin is from 6.9 to 7.8.

17. The imaging member of claim 6, wherein the ratio of the sum of $TiO_2$ and the binder resin to $SiO_2$ is from 92/8 to 93/7; the ratio of SiO2 to the sum of SiO2, TiO2 and binder resin is from 6.9 to 7.8.

* * * * *